H. L. RODGERS AND R. H. HARVEY.
BELT DRIVE FOR CAR LIGHTING SYSTEMS.
APPLICATION FILED SEPT. 29, 1917.
1,314,757.
Patented Sept. 2, 1919.
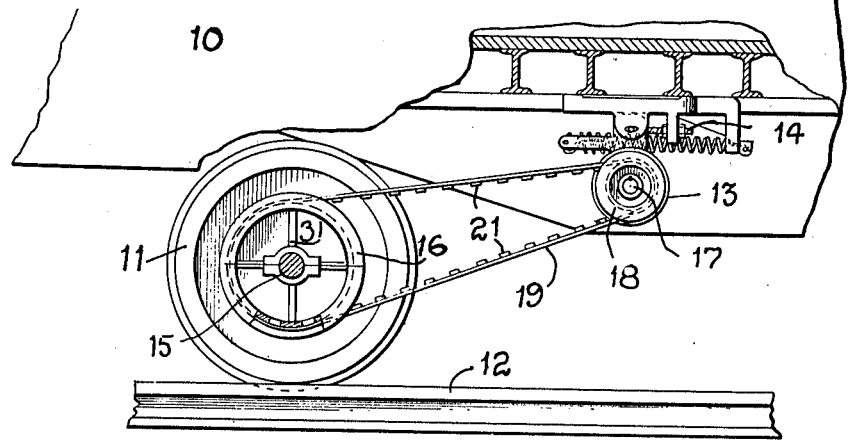
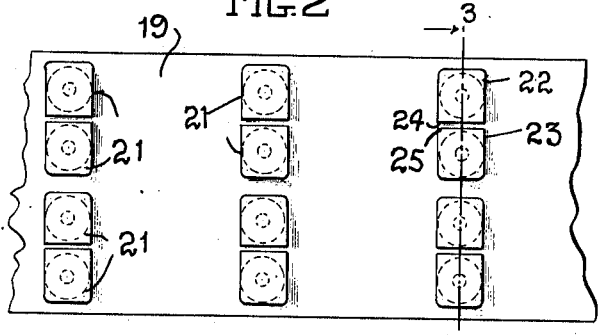
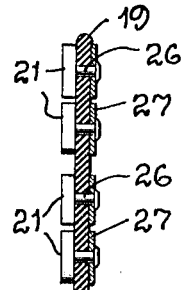
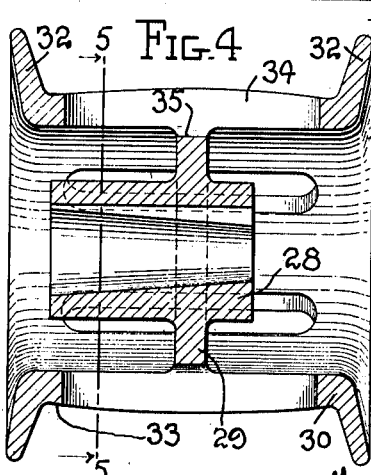
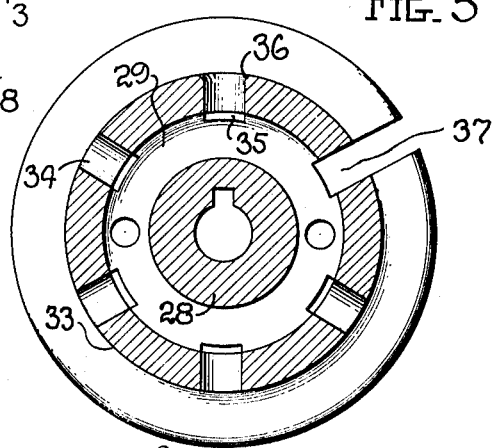
INVENTORS
ATTORNEYS.

UNITED STATES PATENT OFFICE.

HERBERT LESLIE RODGERS, OF NORTH BAY, ONTARIO, AND ROY H. HARVEY, OF MONTREAL, QUEBEC, CANADA, ASSIGNORS TO SAFETY CAR HEATING & LIGHTING COMPANY, A CORPORATION OF NEW JERSEY.

BELT-DRIVE FOR CAR-LIGHTING SYSTEMS.

1,314,757.     Specification of Letters Patent.     Patented Sept. 2, 1919.

Application filed September 29, 1917. Serial No. 193,880.

*To all whom it may concern:*

Be it known that we, HERBERT LESLIE RODGERS and ROY H. HARVEY, the former a subject of the King of Great Britain, residing at North Bay, Province of Ontario, Dominion of Canada, and the latter a citizen of the United States, residing in Montreal, Province of Quebec, Dominion of Canada, have invented an Improvement in Belt-Drives for Car-Lighting Systems, of which the following is a specification.

This invention relates to a generator driving means in connection with a car-lighting system.

One of the objects of this invention is to provide a practical and effective drive for a generator in a car-lighting system, that is efficient under all weather conditions.

Another object of this invention is to provide a positive drive between a car axle and the rotor of an electric generator, of simple construction and reliable action.

Other objects of this invention will be apparent or specifically set forth hereinafter.

The invention accordingly consists in the features of construction, combinations of elements and arrangement of parts which will be exemplified in the structure hereinafter described, and the scope of the application of which will be indicated in the following claims.

In the accompanying drawing one of the various embodiments of the invention is shown, wherein:

Figure 1 shows a general application of the improved belt drive as installed between a car axle and an electric generator.

Fig. 2 is a plan view of the belt showing studs in position.

Fig. 3 is a sectional view through line 3—3 on Fig. 2.

Figs. 4 and 5 are sectional views of the pulley on the generator shaft; Fig. 5 being a section on the line 5—5 of Fig. 4.

Similar reference characters refer to similar parts throughout the specification and the drawings.

Referring now to Fig. 1, a part of any car of a train is represented at 10, and the wheel 11 supports the car by means of any well known truck frame not shown. The wheel 11 is adapted to move over the track 12. An electric generator 13 is shown attached in the usual manner to the bottom of the car 10, and is provided with a longitudinal adjusting means 14. The shaft 17 of the generator carries a pulley 18. A car axle as shown at 15, has a pulley 16 firmly mounted thereon, and a belt 19 passes around both pulleys 16 and 18. These pulleys are recessed as will hereinafter be described, and the working side of the belt 19 is provided with studs or cleats 21. In operation, the studs enter the recesses in the pulleys, thereby giving the positive drive between the car axle and the electric generator.

Now referring to Fig. 2, the belt shown by 19, may be of leather or any composition of rubber and canvas as desired, or of any material which has sufficient strength and flexibility, preferably, however, a four-ply rubber belt is employed. The studs 21 as shown, are made of metal, preferably wrought iron, but hard fiber or the like may be substituted. The studs are arranged across the width of the belt, in two sets of two studs each, and the arbitrary pitch of the studs on the belt, is selected so that any pulley having an even diameter in inches can replace either of the pulleys shown. The selection of such a pitch is made merely for convenience and in order to conform to uniform practice. The number of studs and the sets of studs which are installed across the width of the belt, is not limited to two sets of two each, and any combination of studs may be employed which give sufficient flexibility of the belt under working conditions. Generally the distance between the sets of studs is greater than the distance between any two studs of a set, as such an arrangement allows a greater flexibility of the coöperating parts. The distance between any two studs, such as between 22 and 23, is comparatively slight but the desired flexibility of the belt is derived from such an arrangement as shown in this figure. The adjacent surfaces 24 and 25 of the studs 22 and 23 respectively are square, in order to prevent rotation of the studs from their relative positions on the belt.

Each stud or cleat 21 has a stem 26 which is preferably formed integral therewith. This stem is constructed of such length that it will pass through the belt 19 and receive a washer 27 and be headed down upon the washer. However, any other holding means for the end of the stem 26 against the washer may be employed. The studs in any one set are mounted on the belt so that the stems 26 are sufficiently close to each other so that the square faces of the studs can only rotate to come in contact with each other, thereby preventing any substantial rotation of the studs on their stems 26. The above method of attaching the studs or cleats to the belt has been found to be practical, but this invention in its broader aspects is not limited to the particular type of fastening shown, or to any method of fastening the studs. This invention, so far, has described the studs as being separate members and being attached to the belt. It is obvious that under some conditions the studs or cleats may be made of the same material as the belt and integral therewith. Such a modification would come within the broad aspects of this invention.

Now, referring to Fig. 4, which is a sectional view of the pulley to be mounted on the generator shaft 17, the hub is represented at 28, a web at 29 and a rim at 30. The pulley, being of medium diameter, is in this case, formed with web 29 between the hub and the rim 30. In this invention, it is not necessary that the pulleys be restricted to a web construction, for they may be formed with spokes 31 as shown in Fig. 1. The rim 30 of the pulley has its edges turned outwardly as shown at 32, thereby providing guide means for the belt. The guide means are not limited to being integral parts of the pulley, as they may be additional members attached to the rim 30, or they may be mounted in any position to give the proper guidance to the belt.

Heretofore in car-lighting systems, the slipping of the driving belt has generally been due to the ice and snow which collects on the faces of the pulleys, but by this invention it is practically impossible to have the ice and snow collect to such an extent that the belt slips. One of the means of obtaining a positive drive is to have recesses or slots 34 formed in the face 33 of the pulley and extend, in depth, through the rim 30 and part way into the web 29 as shown at 35 in Figs. 4 and 5. The studs 21, as the belt passes over the pulleys, extend into the recesses 34 and push any obstacles which have collected therein through the depth of the recesses, and discharge such obstacles free of the pulley. During this process the sides of the studs move into engagement with the sides of the recesses, thereby producing the positive drive. The recesses 34 are made sufficiently wide so that they will receive studs 21 when faces 24 and 25 of any set are in contact. The outer edges of the recesses 34 may be beveled as shown at 36 in order that the studs may enter the recesses without trouble and without chipping the edges of the studs. The depth of these recesses is not limited to any particular uniform depth; the essential feature being that the opening between the bottom of the recess and the hub be sufficiently large to allow any ice or snow or other obstacles, which may be thrown between any of the studs 21 and the recesses, to be forced into the bottom of the recess and out by the hub 28. The general practice is to have the recesses extend through the rim 30 of the pulleys for their entire width and length, but this invention, however, is not limited to such an arrangement. As shown in the drawings, the recesses extend substantially across the face 33 of the pulley. In pulleys which have a web construction as shown at 29 in Fig. 4, the recesses may extend the entire width of the pulley, including the guides 32. Such a recess is shown at 37 in Fig. 5. Should the pulleys be formed with spokes as shown at 31, Fig. 1, the recesses generally would not extend the full width of the rim of the pulley, but in such a case it is possible to have a peripheral supporting member attached to the outer ends of the guide members so that there is a continual peripheral support for all divisions of the rim of the pulley. A part of the rim of pulley 16 in Fig. 1 is disclosed in section so that the slots for receiving the studs are clearly shown.

From the above description of the parts, and their method of coöperation, it will be unnecessary to describe in detail the operation of the several parts of this invention, as such operation will be clearly understood by those skilled in the art.

As various possible embodiments might be made of the above invention and as various changes might be made in the embodiment above set forth, it is to be understood that all matter herein set forth or shown in the accompanying drawings is to be interpreted as illustrative and not in a limiting sense.

We claim as our invention:

1. In a car-lighting system, in combination, rotating members being recessed and having the edges of their faces turned outwardly to form guides and having their faces and guides recessed, a belt, and studs at suitable intervals on the working surface of said belt to enter said recesses as said belt passes over said rotating members.

2. In a car-lighting system, in combination, rotating recessed members, a belt connecting said members, and a plurality of sets of studs across the width of said belt for entering said recesses, the adjacent faces of studs in each set being squared to prevent turning thereof.

3. In a car-lighting apparatus, in combination, a driving member, a driven member, and an endless flexible connector coacting with said driving and driven members, said connector having a plurality of studs fastened thereto in positions which prevent rotation of said studs.

4. In a car-lighting apparatus, in combination, a driving member and a driven member, an endless flexible connector coacting with said driving and driven members, and studs in sets of two each extending substantially the width of said connector, each stud pivotally attached to said connector and sufficiently close to its adjacent stud to prevent rotation of said studs.

5. In a belt drive, in combination, a belt and a plurality of studs extending the width of said belt, said studs mounted out of contact with adjacent studs and sufficiently close thereto to prevent substantial relative movement of said studs.

6. In a belt drive, in combination, a perforated belt, and studs in sets of two each attached to said belt through said perforations, the adjacent faces of studs in a set being squared to prevent substantial turning of said studs on their axes.

In testimony whereof, we have signed our names to this specification the 9th day of July, 1917.

HERBERT LESLIE RODGERS.
ROY H. HARVEY.